United States Patent Office 2,832,769
Patented Apr. 29, 1958

2,832,769

PROCESS OF PRODUCING ALPHA, ALPHA-DI-CHLORO-EPSILON-CAPROLACTAM

Thomas R. Hopkins, Joplin, Mo., William C. Francis, Pittsburg, Kans., and James C. Werner, Joplin, Mo., assignors to Spencer Chemical Company, a corporation of Missouri No Drawing. Application March 30, 1956
Serial No. 574,968

8 Claims. (Cl. 260—239.3)

This invention relates to processes of producing chemical compounds. More particularly, this invention is concerned with a process of producing alpha, alpha-dichloro-epsilon-caprolactam of the formula

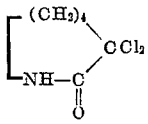

It is disclosed by Von Braun, Ber. 63B, pp. 502–507 (1930); C. A. 24, p. 2999, that epsilon-caprolactam may be reacted with a chlorinating agent, such as $PCl_5$, (phosphorus pentachloride) in the presence of xylene and the resulting reaction product hydrolyzed to produce alpha, alpha-dichloro-epsilon-caprolactam. The present invention is concerned with improvements in this process.

It has now been discovered that $POCl_3$ (phosphorus oxychloride) is a particularly useful liquid medium in which to react epsilon-caprolactam with $PCl_5$ or its equivalent combination of $PCl_3$ and $Cl_2$. Such a system has the advantages of especially high yields of alpha, alpha-dichloro-epsilon-caprolactam, as contrasted with the prior art, and facilitates the isolation and recovery of the product.

This process may be represented as follows:

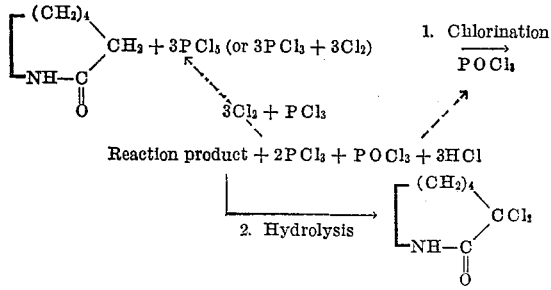

As shown, the chlorination of epsilon-caprolactam with $PCl_5$ results in the attendant production of $PCl_3$ and $POCl_3$ as by-products. Part or all of the $POCl_3$ formed as a by-product may be used as additional reaction medium while the $PCl_3$ may be treated with chlorine to convert it to $PCl_5$ for use in chlorinating additional epsilon-caprolactam.

The chlorination of epsilon-caprolactam with $PCl_5$ in $POCl_3$ may be effected at a reaction temperature above 50° C. and preferably at 80–85° C. The rate of reaction will vary with the temperature although 1 to 5 hours usually is sufficient for substantial completion of the reaction. Stoichiometric amounts of reactants are generally used, i. e., one mole of epsilon-caprolactam and three moles of $PCl_5$, although an excess of the latter may be used.

To suppress or prevent side reactions, it has been found advantageous to first mix epsilon-caprolactam and the $PCl_5$, and preferably these two reactants together with $POCl_3$, at a temperature maintained below 35° C. and above the freezing point of the mixture, and to then effect chlorination at above 50° C. The combined reactants need not be maintained below 35° C. any longer than it takes to mix the quantities together.

After the chlorination step has been terminated, the reaction mixture is distilled, preferably under reduced pressure, until all volatile products including $POCl_3$, $PCl_3$ and HCl are removed. The residue is then hydrolyzed over ice or in a dilute aqueous alkali, such as sodium carbonate. Alpha, alpha - dichloro - epsilon - caprolactam precipitates from the aqueous mixture and may be conveniently recovered by filtration. It may be purified as by recrystallization from ligroin.

The $PCl_3$ and $POCl_3$ by-products of the chlorination step may be distilled and recovered as a mixture. This mixture may then be treated with chlorine gas to convert $PCl_3$ to $PCl_5$. The resulting mixture of $PCl_5$ and $POCl_3$ may be recycled for chlorinating additional epsilon-caprolactam, but preferably these two components are first separated by conventional methods and each material recycled in an amount desired. In this way an otherwise undesirable excess of $POCl_3$ in the reactor is prevented.

It should be noted that the two moles of $PCl_3$ which form in the chlorination step give two moles of $PCl_5$ when treated with chlorine so that of the three moles of $PCl_5$ used originally, two moles of $PCl_5$ are regenerated and charged to the process.

The excess $POCl_3$ which may accumulate and not find use in the process may be readily converted to ammonium phosphate, which product is of value as a fertilizer and basic chemical of commerce.

Alpha, alpha-dichloro-epsilon-caprolactam is converted to alpha-chloro-epsilon-caprolactam by the use of hydrogen with a catalyst such as palladium on charcoal and pressures of about five atmospheres at room temperature. The resulting alpha-chloro-epsilon-caprolactam may then be converted to lysine as shown in Serial No. 574,967, filed March 30, 1956.

The following examples are intended for purposes of illustration and are not to limit the scope of this invention as modifications will be obvious to those skilled in the art.

Example 1

17 gms. (0.15 mole) of epsilon-caprolactam dissolved in 50 mls. of $POCl_3$ was added dropwise, and at such a rate as to maintain a reaction temperature of 78–82° C., to a stirred solution of 94 gms. (0.45 mole) of $PCl_5$ in 150 mls. of $POCl_3$. When addition was complete, the stirred mixture was heated to reflux (104° C.) for a period of 15 minutes. The solvent and volatile by-products were removed by vacuum distillation and the liquid residue added portionwise to cracked ice. On allowing the solution to warm to room temperature there was obtained by filtration 18.3 gms. (67% yield) of alpha, alpha-dichloro-epsilon-caprolactam, M. P. 123–126° C.

Example 2

To 94 gms. (0.45 mole) of $PCl_5$ there was slowly added 17 gms. (0.15 mole) of epsilon-caprolactam in such a manner as to maintain the temperature of the mixture at 27–32° C. There was then added 60 mls. of $POCl_3$ and the temperature adjusted to 70° C. for a period of 1 hour. The reaction mixture was cooled and concentrated by vacuum distillation. The residue was hydrolyzed with cracked ice and the crystalline product removed by filtration followed by water washing and drying to yield 24 gms. (87.9% yield) of alpha, alpha-dichloro-epsilon-caprolactam, M. P. 123–125° C.

Example 3

A run similar to Example 1 was conducted with 188 gms. (0.91 mole) of $PCl_5$ and 34 gms. (0.30 mole) of epsilon-caprolactam wherein the temperature of the PCl$_5$-lactam mixture was maintained at 10–15° C. during their introduction. 50 mls. of POCl$_3$ was added at 15–70° C. and the reaction temperature then held at 70° C. for 2 hours to produce 49.7 gms. (91.1% yield) of alpha, alpha-dichloro-epsilon-caprolactam, M. P. 121–123° C.

*Example 4*

The distillate obtained from Example 1, comprising a mixture of PCl$_3$ and POCl$_3$, was treated with an equivalent amount of chlorine gas to convert the PCl$_3$ to PCl$_5$. An amount of epsilon caprolactam in the ratio of 1:3 moles of lactam:PCl$_5$ was introduced and the mixture refluxed for approximately 15 minutes. This reaction product was then concentrated under reduced pressure, and the oily residue hydrolyzed in ice water followed by neutralization with sodium carbonate to give a 67% yield of crude alpha, alpha-dichloro-epsilon-caprolactam, M. P. 119–122° C.

Various changes and modifications of the invention can be made and, to the extent that such variations incorporate the spirit of this invention, they are intended to be included within the scope of the appended claims.

What is claimed is:

1. The process which comprises chlorinating epsilon-caprolactam with PCl$_5$ in the presence of added POCl$_3$ and hydrolyzing the reaction product to form alpha, alpha-dichloro-epsilon-caprolactam.

2. The process of claim 1 in which the chlorination is effected above 50° C.

3. The process of claim 1 in which the chlorination is effected at 80–85° C.

4. The process which comprises mixing epsilon-caprolactam with PCl$_5$ while maintaining the temperature of the mixture below 35° C., reacting said substances in the presence of added POCl$_3$ at a temperature above 50° C., and hydrolyzing the reaction product to form alpha, alpha-dichloro-epsilon-caprolactam.

5. The process which comprises mixing epsilon-caprolactam, PCl$_5$ and POCl$_3$ while maintaining the temperature of the mixture at about 5° C. to 35° C., effecting the chlorination at a temperature above 50° C., distilling off the solvent and volatile by-products, and hydrolyzing the residue to form alpha, alpha-dichloro-epsilon-caprolactam.

6. The process which comprises reacting epsilon-caprolactam with PCl$_5$ in the presence of added POCl$_3$, distilling off the volatiles including the by-products PCl$_3$ and POCl$_3$ hydrolyzing the residue to form alpha, alpha-dichloro-epsilon-caprolactam, treating the PCl$_3$ with chlorine to form PCl$_5$, recycling the PCl$_5$ so formed and reacting it with additional epsilon-caprolactam in the presence of POCl$_3$.

7. The process which comprises reacting epsilon-caprolactam with PCl$_5$ in the presence of added POCl$_3$ above 50° C., distilling off the volatiles including the by-products PCl$_3$ and POCl$_3$, hydrolyzing the residue to form alpha, alpha-dichloro-epsilon-caprolactam, treating the PCl$_3$ with chlorine to form PCl$_5$, recycling the PCl$_5$ so formed and part of the POCl$_3$ and mixing the PCl$_5$ and POCl$_3$ with additional epsilon-caprolactam.

8. The process which comprises mixing epsilon-caprolactam with PCl$_5$ in the presence of added POCl$_3$ while maintaining the temperature of the mixture at about 5° C. to 35° C., effecting the chlorination at a temperature above 50° C., distilling off the volatiles including the by-products PCl$_3$ and POCl$_3$, hydrolyzing the residue to form alpha, alpha-dichloro-epsilon-caprolactam, treating the PCl$_3$ with chlorine to form PCl$_5$, recycling the PCl$_5$ so formed and part of the POCl$_3$ and mixing the PCl$_5$ and POCl$_3$ with additional epsilon-caprolactam.

References Cited in the file of this patent

Von Braun: Ber., vol. 63, pp. 502–057 (1930).

UNITED STATES PATENT OFFICE
CERTIFICATE OF CORRECTION

April 29, 1958

Patent No. 2,832,769

Thomas R. Hopkins et al.

It is hereby certified that error appears in the printed specification of the above numbered patent requiring correction and that the said Letters Patent should read as corrected below.

Column 4, line 36, list of references cited, for "pp. 502-057" read -- pp. 502-507 --.

Signed and sealed this 15th day of July 1958.

(SEAL)

Attest:

KARL H. AXLINE

Attesting Officer

ROBERT C. WATSON
Commissioner of Patents